(12) United States Patent
Morimoto et al.

(10) Patent No.: US 9,005,840 B2
(45) Date of Patent: Apr. 14, 2015

(54) POLYMER FUEL CELL STACK AND POLYMER FUEL CELL SEPARATOR PAIR

(75) Inventors: Takashi Morimoto, Osaka (JP);
Toshihiro Matsumoto, Fukuoka (JP);
Atusi Murata, Shiga (JP); Mitsuo Yoshimura, Kyoto (JP); Yoko Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 323 days.

(21) Appl. No.: 13/386,957

(22) PCT Filed: Jul. 14, 2010

(86) PCT No.: PCT/JP2010/004571
§ 371 (c)(1),
(2), (4) Date: Jan. 25, 2012

(87) PCT Pub. No.: WO2011/013313
PCT Pub. Date: Feb. 3, 2011

(65) Prior Publication Data
US 2012/0251918 A1 Oct. 4, 2012

(30) Foreign Application Priority Data
Jul. 27, 2009 (JP) .................................. 2009-174508

(51) Int. Cl.
*H01M 2/18* (2006.01)
*H01M 8/02* (2006.01)
*H01M 8/10* (2006.01)

(52) U.S. Cl.
CPC .......... *H01M 8/0254* (2013.01); *H01M 8/0273* (2013.01); *H01M 8/0276* (2013.01);
(Continued)

(58) Field of Classification Search
USPC ...................... 429/34, 35, 489, 482
See application file for complete search history.

(56) References Cited

U.S. PATENT DOCUMENTS

2002/0117780 A1    8/2002    Inoue et al.
2003/0129466 A1    7/2003    Sugita et al.
(Continued)

FOREIGN PATENT DOCUMENTS

CN    1864295 A      11/2006
CN    101335356 A    12/2008
(Continued)

OTHER PUBLICATIONS
English translation of JP 2007200700 A, Aug. 2007, Sugiura.*
(Continued)

*Primary Examiner* — Jonathan Jelsma
*Assistant Examiner* — Rashid Alam
(74) *Attorney, Agent, or Firm* — Pearne & Gordon LLP

(57) ABSTRACT

A fuel cell separator pair has first and second separators having front and back surfaces, a corrugated plate portion shaped in a wave form at the central portion, and a flat plate portion formed in the peripheral portion and surrounding the corrugated plate portion, wherein the corrugated plate portion of the front surface constitutes a reaction gas channel and the corrugated plate portion of the back surface constitutes a coolant channel. The back surfaces of the first and second separators are facing each other. The flat plate portions of the first and second separators are arranged on top of each other so as to be in contact with each other. The flat plate portion of the second separator protrudes toward the outside beyond the flat plate portion of the first separator. The fuel cell separator pair has a seal member (A) disposed on the flat plate portion of the front surface of the first separator, a seal member (B) disposed on the flat plate portion of the front surface of the second separator, and a seal member (C) disposed on the region protruding beyond the flat plate portion of the first separator in the flat plate portion of the back surface of the second separator.

4 Claims, 17 Drawing Sheets

(52) U.S. Cl.
CPC .......... *H01M8/0286* (2013.01); *H01M 8/0206* (2013.01); *H01M 2008/1095* (2013.01); *Y02E 60/50* (2013.01)

(56) References Cited

U.S. PATENT DOCUMENTS

| | | |
|---|---|---|
| 2004/0219410 A1 | 11/2004 | Tanaka et al. |
| 2006/0024561 A1 | 2/2006 | Sato et al. |
| 2006/0088752 A1 | 4/2006 | Sakano et al. |
| 2007/0122679 A1 | 5/2007 | Hayashi et al. |
| 2008/0187812 A1 | 8/2008 | Watanabe et al. |
| 2009/0004539 A1* | 1/2009 | Ishikawa et al. ............... 429/35 |
| 2009/0075134 A1 | 3/2009 | Tanaka et al. |
| 2009/0197146 A1* | 8/2009 | Nonogaki et al. ............. 429/34 |
| 2009/0311571 A1* | 12/2009 | Takahashi et al. ............. 429/30 |

FOREIGN PATENT DOCUMENTS

| | | | |
|---|---|---|---|
| JP | 2000-231927 A | | 8/2000 |
| JP | 2001-015132 A | | 1/2001 |
| JP | 2002-134129 A | | 5/2002 |
| JP | 2002-231264 A | | 8/2002 |
| JP | 2004-055427 A | | 2/2004 |
| JP | 2004-319279 A | | 11/2004 |
| JP | 2004-335178 A | | 11/2004 |
| JP | 2005-116404 A | | 4/2005 |
| JP | 2005-243286 A | | 9/2005 |
| JP | 2006-216294 A | | 8/2006 |
| JP | 3868810 B2 | | 10/2006 |
| JP | 2007-157559 A | | 6/2007 |
| JP | 2007-172992 A | | 7/2007 |
| JP | 2007-200700 A | | 8/2007 |
| JP | 2007200700 A | * | 8/2007 |
| JP | 2009-9838 A | | 1/2009 |
| JP | 2009-123381 A | | 6/2009 |
| JP | 2009-164081 A | | 7/2009 |

OTHER PUBLICATIONS

International Search Report for PCT/JP2010/004571 dated Oct. 12, 2010.

Supplementary European Search Report for Application No. 10804066.8 dated Oct. 17, 2013.

* cited by examiner

POLYMER FUEL CELL STACK AND POLYMER FUEL CELL SEPARATOR PAIR

TECHNICAL FIELD

The present invention relates to a polymer fuel cell stack and a pair of separators for a polymer fuel cell.

BACKGROUND ART

A polymer fuel cell stack (hereinafter also simply referred to as "fuel cell stack") includes a cell assembly in which multiple unit fuel cells are stacked and connected in series. Each unit fuel cell is composed of a membrane electrode assembly (hereinafter also referred to as "MEA") and a pair of separators arranged at both sides of the MEA. The MEA includes a polymer electrolyte membrane and a pair of catalyst electrodes (fuel electrode and air electrode) arranged at both sides of the polymer electrolyte membrane. The separator includes gas channels for supplying fuel gas or oxidizing gas to the MEA. The separator further includes a coolant channel for allowing a coolant to flow for controlling the temperature of the fuel cell stack under operation. Respective unit fuel cells are electrically connected via the pair of separators.

Further, in the fuel cell stack, in order to ensure sealing between unit fuel cells and decrease contact resistance between unit fuel cells, a pressure is applied in the direction along which the unit fuel cells are stacked (hereinafter also referred to as "fastening pressure").

In recent years, a method is suggested for manufacturing separators by pressing metal plates into a wave shape. The separator manufactured by pressing a metal plate is called a metal separator.

As described above, the separator includes channels for allowing reaction gases (fuel gas and oxidizing gas) and a coolant to flow. Because fuel gas, oxidizing gas, and a coolant need to be supplied to their respective separate channels, a fuel cell stack includes sealing members for hermetically sealing the channels so as to prevent the respective channels from communicating with one another (for example, see Patent Literatures 1 to 8).

According to Patent Literatures 1 to 7, sealing members are stacked between an MEA and a separator and between adjacent separators to seal in reaction gases and a coolant. However, fuel cell stacks disclosed in Patent Literatures 1 to 7 have a disadvantage of deviating the relative position of separators or deviating the positions at which sealing members are arranged.

A technique for overcoming such a problem is shown in FIG. 1 (for example, see Patent Literature 8). FIG. 1 is a cross-sectional view of an end of a pair of metal separators disclosed in Patent Literature 8. In FIG. 1, in a fuel cell stack, adjacent two metal separators (first metal separator 1 and second metal separator 2) and sealing member 10 are integrated. First metal separator 1 includes corrugated plate section 5 and flat plate section 6, and second metal separator 2 includes corrugated plate section 7 and flat plate section 8. Flat plate section 6 is not in contact with flat plate section 8, and a sealing member is arranged between them.

As described above, by integrating metal separators and a sealing member, it is possible to prevent the positions at which sealing members are arranged from being deviated, improving reliability of sealing. Further, by integrating metal separators and a sealing member, the relative position of the metal separators can be fixed, facilitating easier assembly of a fuel cell stack.

However, in a pair of separators integrated with a sealing member with the sealing member being arranged between flat plate sections 6 and 8 such as that shown in Patent Literature 8, when a fastening pressure is applied to sealing member 10 in the arrow direction, ends of metal separators 1 and 2 may be deformed and thus metal separators 1 and 2 may be deformed as shown in FIG. 2. When the metal separators are deformed, sealing reliability may decrease and contact resistance between unit fuel cells may increase. For this reason, in a fuel cell stack having a pair of separators such as that disclosed in Patent Literature 8, reaction gases and a coolant may leak to outside or electrically-output of the fuel cell stack may lower.

To overcome this problem, in adjacent fuel cell stacks, flat plate sections of metal separators may be arranged on top of each other so as to be in contact with each other (for example, see Patent Literature 9).

FIG. 3 is a partially enlarged view of a cross section of a fuel cell stack disclosed in Patent Literature 9. As shown in FIG. 3, in a fuel cell stack disclosed in Patent Literature 9, flat plate sections of a pair of adjacent metal separators 30 are in contact with each other, without a sealing member being arranged between the flat plate sections. By making flat plate sections of a pair of adjacent metal separators in contact with each other in this way, the separators are prevented from being deformed even when a pressure (fastening pressure) is applied to the fuel cell stack in the direction along which cells are stacked.

Further, in the fuel cell stack shown in FIG. 3, a pair of adjacent separators 30 adhere with adhesive 28, and separators 30 and an MEA also adhere with adhesive 28.

CITATION LIST

Patent Literature

PTL 1
Japanese Patent No. 3868810
PTL 2
Japanese Patent Application Laid-Open No. 2004-319279
PTL 3
Japanese Patent Application Laid-Open No. 2006-216294
PTL 4
Japanese Patent Application Laid-Open No. 2005-243286
PTL 5
U.S. Patent Application Publication No. 2006/0024561
PTL 6
U.S. Patent Application Publication No. 2006/0088752
PTL 7
U.S. Patent Application Publication No. 2008/0187812
PTL 8
Japanese Patent Application Laid-Open No. 2007-172992
PTL 9
Japanese Patent. Application Laid-Open No. 2001-15132

SUMMARY OF INVENTION

Technical Problem

However, in the case where flat plate sections of a pair of adjacent metal separators are made in contact with each other without a sealing member being arranged between the flat plate sections as shown in FIG. 3, a coolant flowing between the pair of adjacent metal separators may leak through a gap between the flat plate sections. This is because it is technically difficult to make a flat plate section of a metal separator complete flat, and thus it is inevitable that a fine gap appears between two flat plate sections which are in contact with each other. As described above, in a fuel cell stack having metal separators, it has been difficult to reliably seal in fluids (reaction gases and coolants).

It is therefore an object of the present invention to provide a pair of separators for a fuel cell that is integrated with a sealing member that maintains sealing reliability.

Solution to Problem

A first aspect of the present invention relates to a pair of separators for a fuel cell given below.

[1] A pair of separators for a fuel cell comprising:
a first separator and a second separator, each of the first separator and the second separator having a front surface and a rear surface and having at a center of the separator a corrugated plate section molded into a wave shape and at an outer edge of the separator a flat plate section enclosing the corrugated plate section,
the corrugated plate section on the front surface constituting a reaction gas channel,
the corrugated plate section on the rear surface constituting a coolant channel,
the first separator and the second separator being arranged on top of each other so that the rear surfaces of the first separator and the second separator face each other and that the flat plate section of the first separator and the flat plate section of the second separator are in contact with each other,
the flat plate section of the second separator protruding outwardly beyond the edge of the flat plate section of the first separator;
sealing member A arranged on the flat plate section on the front surface of the first separator;
sealing member B arranged on the flat plate section on the front surface of the second separator; and
sealing member C arranged on a region on the flat plate section on the rear surface of the second separator, the region protruding outwardly beyond the flat plate section of the first separator.

[2] The pair of separators for a fuel cell according to [1], further comprising sealing member D arranged on the flat plate section on the front surface of the second separator and arranged at a position outside sealing member B,
wherein the sealing member A is positioned opposite to sealing member B with respect to the pair of separators, and
the sealing member C is positioned opposite to sealing member D with respect to the second separator.

[3] The pair of separators for a fuel cell according to [2],
wherein the first separator is an air electrode separator, and
the second separator is a fuel electrode separator.

[4] The pair of separators for a fuel cell according to any one of [2] and [3], further comprising a protector covering an edge of the second separator,
wherein the sealing members A, B, C, and D, and the protector are integrally molded.

[5] The pair of separators for a fuel cell according to [4],
wherein the integrally molded sealing member has an opening, and
part of the flat plate section of the first separator or the second separator is exposed through the opening.

[6] The pair of separators for a fuel cell according to any one of [4] and [5],
wherein the flat plate section of the first separator has a hole filled with the integrally molded sealing member, and
the flat plate section of the second separator has a hole filled with the integrally molded sealing member.

[7] The pair of separators for a fuel cell according to any one of [4] and [5],
wherein the flat plate section of the first separator has a protrusion embedded in the integrally molded sealing member, and
the flat plate section of the second separator has a protrusion embedded in the integrally molded sealing member.

A second aspect of the present invention relates to a fuel cell stack given below.

[8] A fuel cell stack comprising:
a membrane electrode assembly having a polymer electrolyte membrane and a pair of catalyst electrodes, the pair of catalyst electrodes including a fuel electrode and an air electrode sandwiching the polymer electrolyte membrane; and
the pair of separators for a fuel cell according to any one of any one of [1] to [7].

[9] The fuel cell stack according to [8],
wherein the membrane electrode assembly further comprises a frame covering outer edges of the polymer electrolyte membrane and the catalyst electrodes.

Advantageous Effects of Invention

With a pair of separators for a fuel cell of the present invention, a fluid flowing through channels of the pair of separators can be reliably sealed in. Therefore, use of a pair of separators for a fuel cell of the present invention can provide a fuel cell stack that prevents reaction gases and a coolant from leaking to outside.

DESCRIPTION OF EMBODIMENTS

Figure 1:
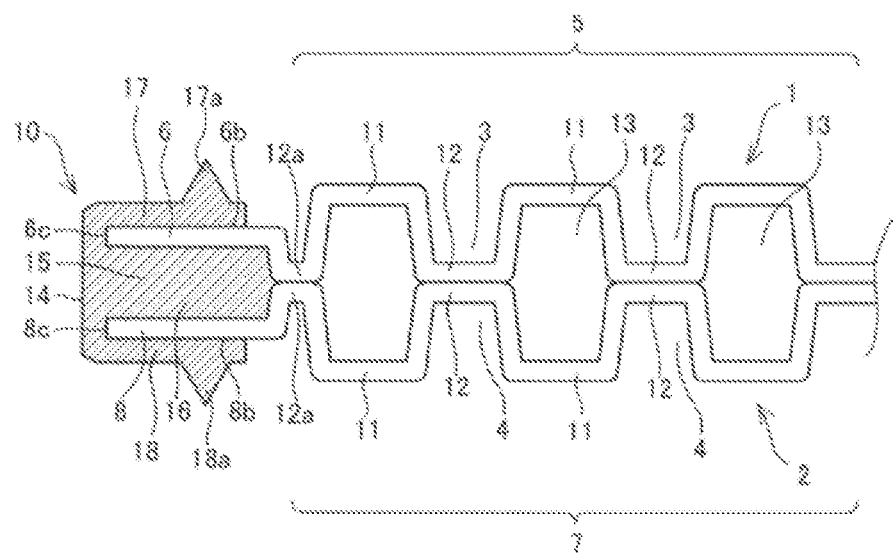
FIG. 1 is a cross-sectional view of a conventional pair of separators for a fuel cell that are integrated with a sealing member.

1. Fuel Cell Stack of the Present Invention

A fuel cell stack of the present invention includes a cell assembly. The cell assembly is a stack of unit fuel cells, each of the unit fuel cell being composed of a membrane electrode assembly (hereinafter also referred to as "MEA") and a pair of separators sandwiching the MEA. The fuel cell stack of the present invention may further include end plates sandwiching a current collector and the cell assembly (see FIG. 4).

The MEA includes a polymer electrolyte membrane and a pair of catalyst electrodes composed of a fuel electrode and an air electrode that sandwich the polymer electrolyte membrane. Respective pair of catalyst electrodes preferably include a catalyst layer being in contact with the polymer electrolyte membrane and a gas diffusion layer stacked on the catalyst layer.

The polymer electrolyte membrane is a polymer membrane which selectively transports protons in a humidified state. The material of the polymer electrolyte membrane is not particularly limited so long as the material can selectively allow hydrogen ions to pass through. Examples of such materials include fluorine polymer electrolyte membranes and hydrocarbon polymer electrolyte membranes. Specific examples of fluorine polymer electrolyte membranes include NAFION® membranes (DuPont), FLEMION® membranes (Asahi Glass Co., Ltd.), ACIPLEX® membranes (Asahi Kasei Corporation), and GORE-SELECT® membranes (Japan Gore-Tex Inc.).

The catalyst layer contains a catalyst which promotes an oxidation-reduction reaction of hydrogen and oxygen. The catalyst layer is not particularly limited so long as it is electrically conductive and is catalytically active for the oxidation-reduction reaction of hydrogen and oxygen. The catalyst layer at an air electrode contains as a catalyst platinum, platinum-cobalt alloy, platinum-cobalt-nickel alloy or the like. The catalyst layer at a fuel electrode contains as a catalyst platinum, platinum-ruthenium alloy or the like.

The catalyst layer contains carbon fine particles (e.g., acetylene black, Ketjen Black or Vulcan) supporting the corresponding catalyst, and water-repellent resin such as polytetrafluoroethylene (PTFE) or the like.

The gas diffusion layer is a conductive porous layer. The material of the gas diffusion layer is not particularly limited so long as it is conductive and can diffuse reaction gas. The gas diffusion layer may be composed of a gas diffusion base material layer for diffusing gas supplied from separators to the catalyst layer, and a carbon coat layer for improving attachment between the gas diffusion base material layer and the catalyst layer.

The MEA may further include a frame. The frame is a component for covering the outer edges of a polymer electrolyte membrane and catalyst electrodes to support the polymer electrolyte membrane and the catalyst electrodes. The frame accommodates a polymer electrolyte membrane and catalyst electrodes so that the catalyst electrodes are in contact with a pair of separators.

The frame preferably has heat resistance and acid resistance, and is generally made of a resin. Examples of such frame material include polypropylene, polyphenylene sulfide, and polypropylene glycol.

The frame includes reaction gas manifold holes for intaking and discharging reaction gases (fuel gas and oxidizing gas) and coolant manifold holes for intaking and discharging a coolant.

The frame may be formed by 1) providing a mold having a cavity in a shape of the frame, and 2) filling the cavity of the mold with any of the above-described frame materials and cooling the material for solidification.

The separator is a conductive member having channels for supplying reaction gases to the MEA, and a channel for supplying a coolant to cool a fuel cell.

According to the present invention, the separator may be manufactured by machine processing a conductive plate for a channel, or may be manufactured by pressing a conductive plate for a channel (hereinafter, simply referred to as "wave-shaped separator"). According to the present invention, the separator is preferably a wave-shaped separator. The wave-shaped separator includes at its center a corrugated plate section that is molded into a wave shape, and at its outer edge a flat plate section that encloses the center (see FIG. 5). The corrugated plate section has a wave-shape cross section, with the thickness of the conductive plate constituting the corrugated plate section being constant. On the other hand, the conductive plate constituting the flat plate section is flat.

The wave-shaped separator may be manufactured by pressing a metal plate or a carbon sheet. The wave-shaped separator manufactured by pressing a metal plate is also called a metal separator.

Each separator includes reaction gas manifold holes for supplying and discharging reaction gases (fuel gas and oxidizing gas) and coolant manifold holes for supplying and discharging a coolant.

Further, each separator has front and rear surfaces. Here, "front surface of a separator" refers to a surface facing an MEA and "rear surface of the separator" refers to a surface of the separator opposite from the front surface.

In the case of the wave-shaped separator, the corrugated plate section on the front surface constitutes a reaction gas channel, and the corrugated plate section on the rear surface constitutes a coolant channel.

As described above, in a fuel cell stack, these unit fuel cells are stacked and thus they are adjacent to each other. When unit fuel cells are adjacent to each other, a metal separator in one unit fuel cell and a metal separator in another unit fuel cell are adjacent to each other on the surfaces facing away the MEAs. A feature of the present invention lies in a structure of two metal separators arranged adjacent to each other as described above (hereinafter simply referred to as "a pair of separators"). The structure of a pair of separators of the present invention will be described in detail below in the section titled "2. Pair of separators for a fuel cell."

2. Pair of Separators for a Fuel Cell of the Present Invention

As described above, a pair of separators of the present invention includes adjacent two separators (first and second separators) and sealing members in a fuel cell stack.

According to a pair of separators of the present invention, the first and second separators are arranged on top of each other so that their respective rear surfaces (surfaces on which a coolant channel is formed) face each other. By arranging the first separator and the second separator on top of each other, a coolant channel is formed between the pair of separators. Further, according to the pair of separators of the present invention, the first and second separators are arranged on top of each other so that the flat plate section of the first separator and the flat plate section of the second separator are in contact with each other (see FIG. 6B). However, the flat plate section of the first separator and the flat plate section of the second separator do not adhere to each other. Further, a rib of a corrugated plate section of the first separator is preferably in contact with a rib of a corrugated plate section of the second separator, but the ribs of the corrugated plate sections of the first separator and the second separator do not adhere to each other, as is the case with the flat plate sections.

Figure 2:
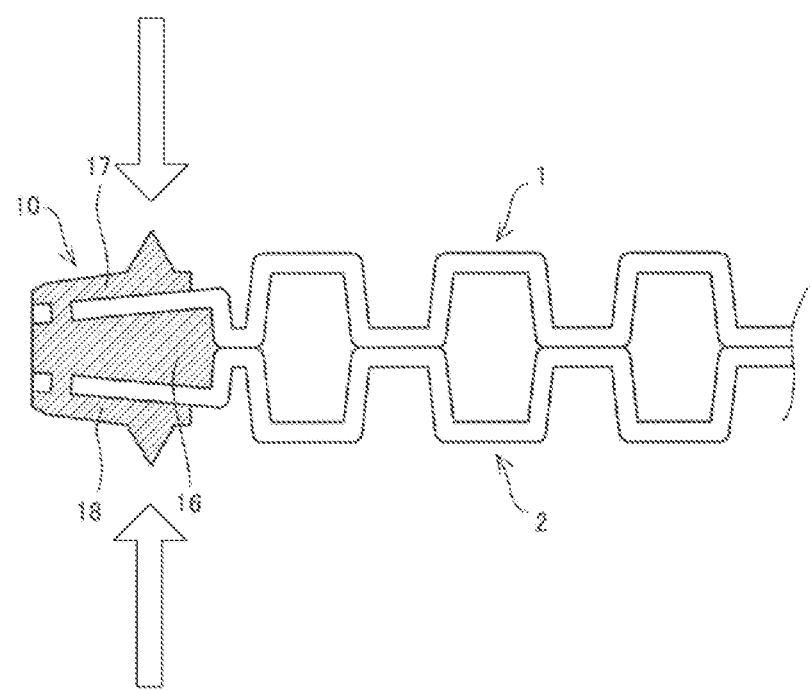
FIG. 2 is a cross-sectional view of a conventional pair of separators for a fuel cell that are integrated with a sealing member when a pressure has been applied to the sealing member.

In a conventional pair of separators, a flat plate section of a first separator and a flat plate section of a second separator are not in contact with each other, and a gap between the flat plate sections is filled with a sealing member (see FIG. 2). For this reason, when a pressure (hereinafter also referred to as "fastening pressure") is applied to a fuel cell stack in the direction along which cells are stacked, ends of separators may be deformed (see FIG. 2). On the other hand, when flat plate sections of separators are in contact with each other as with the present invention, ends of the separators will not be deformed even when a fastening pressure is applied to a fuel cell stack.

Further, according to the present invention, the first and second separators do not adhere to each other, allowing easier disassembly, of a fuel cell stack. Therefore, with the fuel cell stack of the present invention, it is easy to replace old separators from the stack and recycle separators.

Figure 6A:
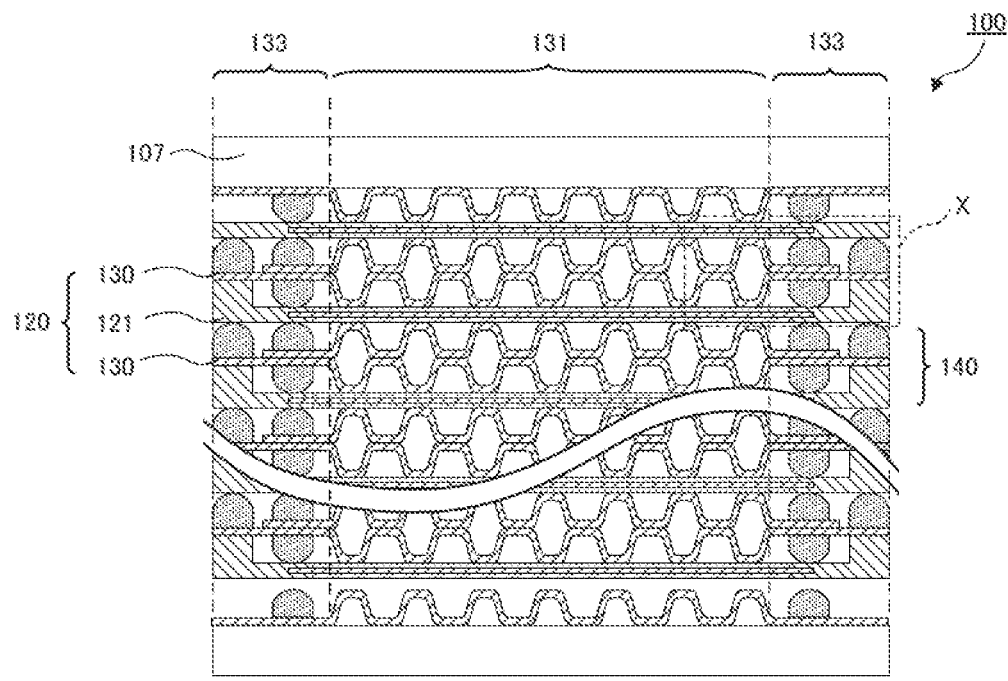
FIGS. 6A to 6C are cross-sectional views of a fuel cell stack according to Embodiment 1.
Figure 6B:
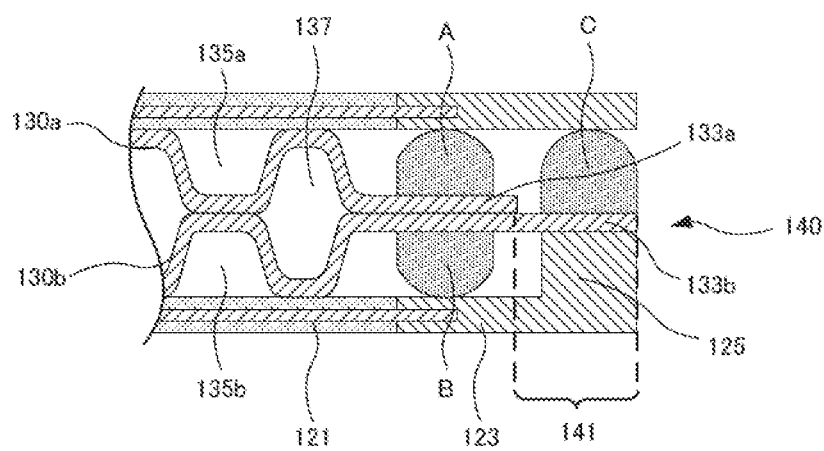

Further, according to the present invention, part of the flat plate section of the second separator protrudes outwardly beyond the edge of the flat plate section of the first separator (see FIG. 6B). Hereinafter, a region of the flat plate section of the second separator that protrudes outwardly beyond the edge of the flat plate section of the first separator is also referred to as "protruding region".

As described above, the pair of separators of the present invention include sealing members. The sealing members include at least sealing members A, B, and C. The material of the sealing member is not particularly limited so long as it has elasticity, and may be thermosetting materials or thermoplastic materials. Examples of thermosetting materials include silicone and EPDM. Examples of thermoplastic materials include elastomers. Respective sealing members are secured on the flat plate section of a separator. Each sealing member seals a space between an MEA and a separator by being pressed against the MEA with a fastening pressure (see FIG. 8A).

Sealing member A is arranged on the flat plate section on the front surface of the first separator, and seals in reaction gas flowing through a reaction gas channel of the first separator (hereinafter also simply referred to as "first reaction gas") (see FIG. 8A). Sealing member B is arranged on the flat plate section on the front surface of the second separator, and seals in reaction gas flowing through a reaction gas channel of the second separator (hereinafter also simply referred to as "second reaction gas") (see FIG. 8A).

Figure 8A:
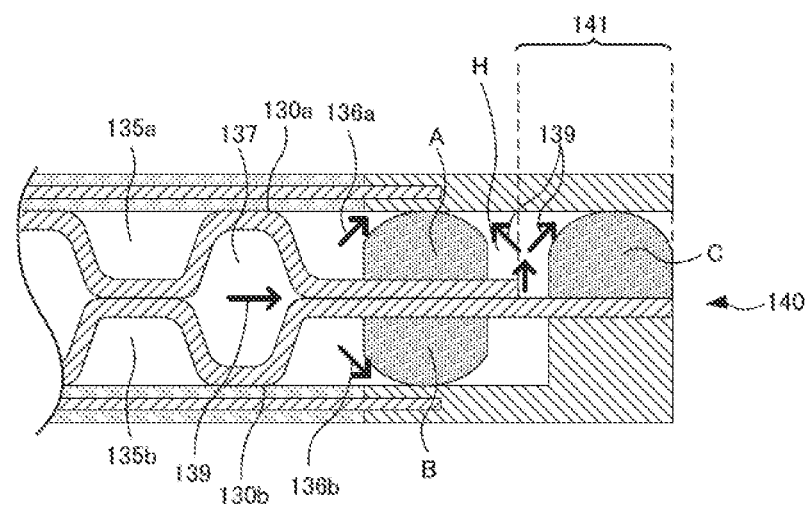
FIGS. 8A to 8C show flow of reaction gases and a coolant flowing in a fuel cell stack.

Sealing member C is arranged at the outer side of the fuel cell stack, which is outside the edge of the first separator, and seals in a coolant flowing through a coolant channel formed by the first and second separators (a coolant channel formed between the pair of separators by arranging the first separator and the second separator on top of each other) (see FIG. 8A).

Further, sealing, member C is arranged on the protruding region on the rear surface of the second separator. By arranging sealing member C on the protruding region in this way, sealing member C can be firmly supported. Accordingly, when a pressure is applied to a cell assembly in the direction along which unit fuel cells are stacked, sealing member C can be prevented from being deformed (see FIG. 8C).

The pair of separators of the present invention preferably further includes sealing member D (see Embodiment 2). Further, in the pair of separators of the present invention, it is in particular preferable that all sealing members be integrally molded to constitute an integrally-molded sealing member (see Embodiment 3).

Figure 10:
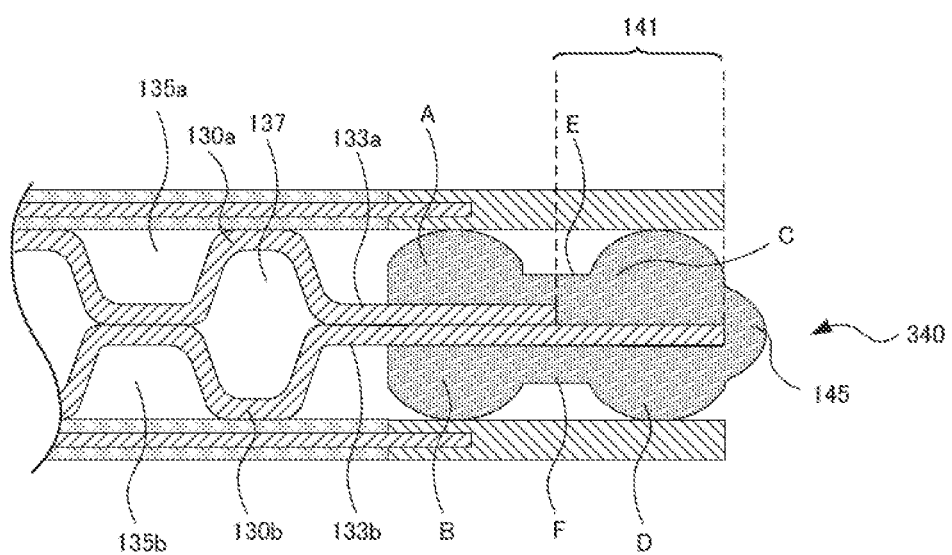
FIG. 10 is a cross-sectional view of a pair of separators for a fuel cell according to Embodiment 3.

Even when all of the sealing members are integrally molded, it is preferable that each sealing member be in line contact with the MEA (see FIG. 10). On the other hand, when the integrally-molded sealing member is in surface contact with the MEA, there is a likelihood that a fastening pressure to be applied to the sealing member is dispersed, impairing the channel's property for sealing in a fluid (see FIG. 11).

As described above, according to the present invention, by arranging the flat plate section of the first separator and the flat plate section of the second separator on top of each other, and arranging sealing member C on the protruding region on the rear surface of the second separator, fluids (reaction gases and a coolant) flowing through channels between a pair of separators can be reliably sealed in. A mechanism of sealing in fluids reliably will be described in detail in Embodiment 1.

Figure 3:
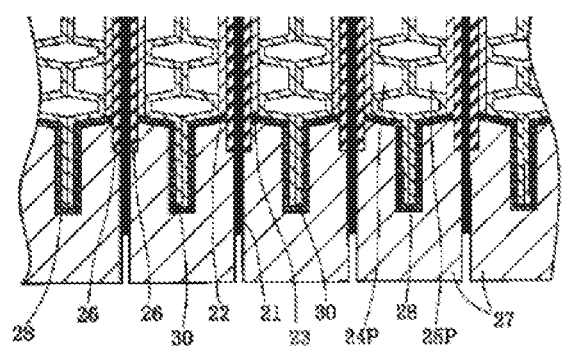
FIG. 3 is a partially enlarged view of a cross section of a conventional fuel cell stack.

Further, according to the present invention, fluids are sealed in by a fastening pressure to be applied to sealing members, so that, when the sealing members have deteriorated, the channel's property for sealing in a fluid will not be impaired so long as the fastening pressure is not weakened. On the other hand, when a fluid is sealed in by adhesive force of adhesive 28 as with the conventional fuel cell stack shown in FIG. 3, deteriorated adhesive 28 will impair the channel's property for sealing in a fluid.

Hereinafter, embodiments of the present invention will be described in detail with reference to the accompanying drawings.

Embodiment 1

Figure 4:
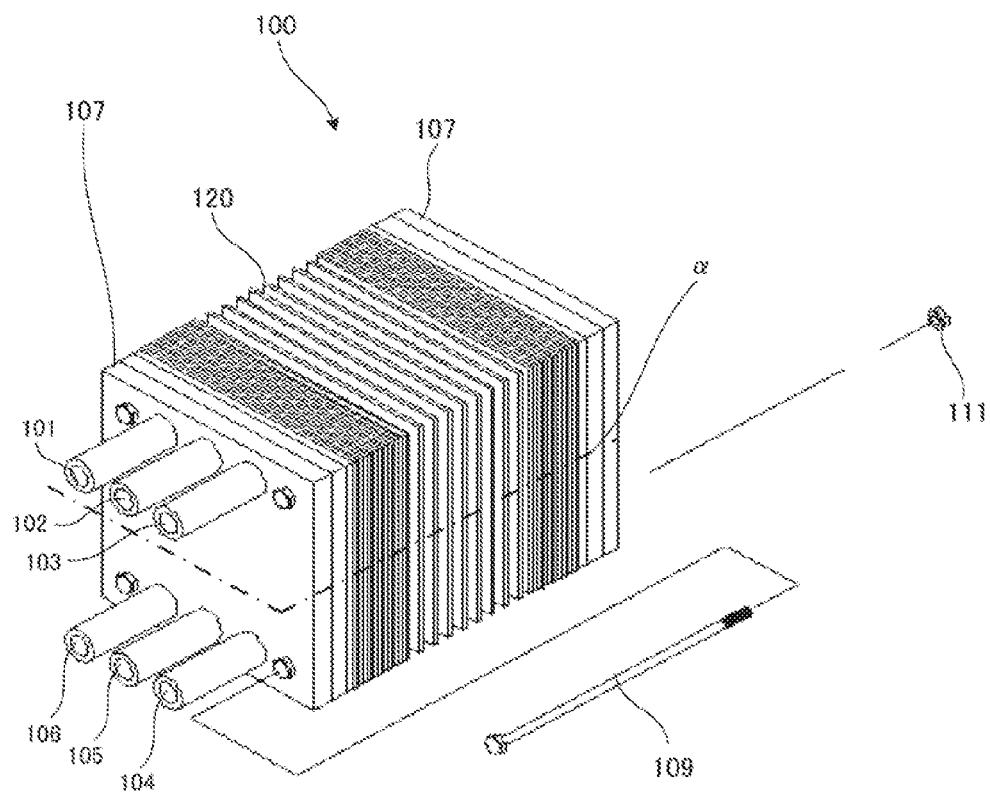
FIG. 4 is a perspective view of a fuel cell stack according to Embodiment 1.

FIG. 4 is a perspective view of fuel cell stack 100 according to Embodiment 1 of the present invention. As shown in FIG. 4, fuel cell stack 100 of Embodiment 1 includes multiple unit fuel cells 120 that are stacked. A stack of unit fuel cells (cell assembly) is sandwiched between two end plates 107 and secured by fastening bolts 109 and nuts 111.

Further, fuel cell stack 100 includes first reaction gas supply port 101, coolant supply port 102, second reaction gas supply port 103, first reaction gas discharge port 104, coolant discharge port 105, and second reaction gas discharge port 106, in one of end plates 107. First reaction gas supply port 101 is connected to a first reaction gas supply manifold, coolant supply port 102 is connected to a coolant supply manifold, and second reaction gas supply port 103 is connected to a second reaction gas supply manifold. Further, first reaction gas discharge port 104 is connected to a first reaction gas discharge manifold, coolant discharge port 105 is connected to a coolant discharge manifold, and second reaction gas discharge port 106 is connected to a second reaction gas discharge manifold.

Figure 5:
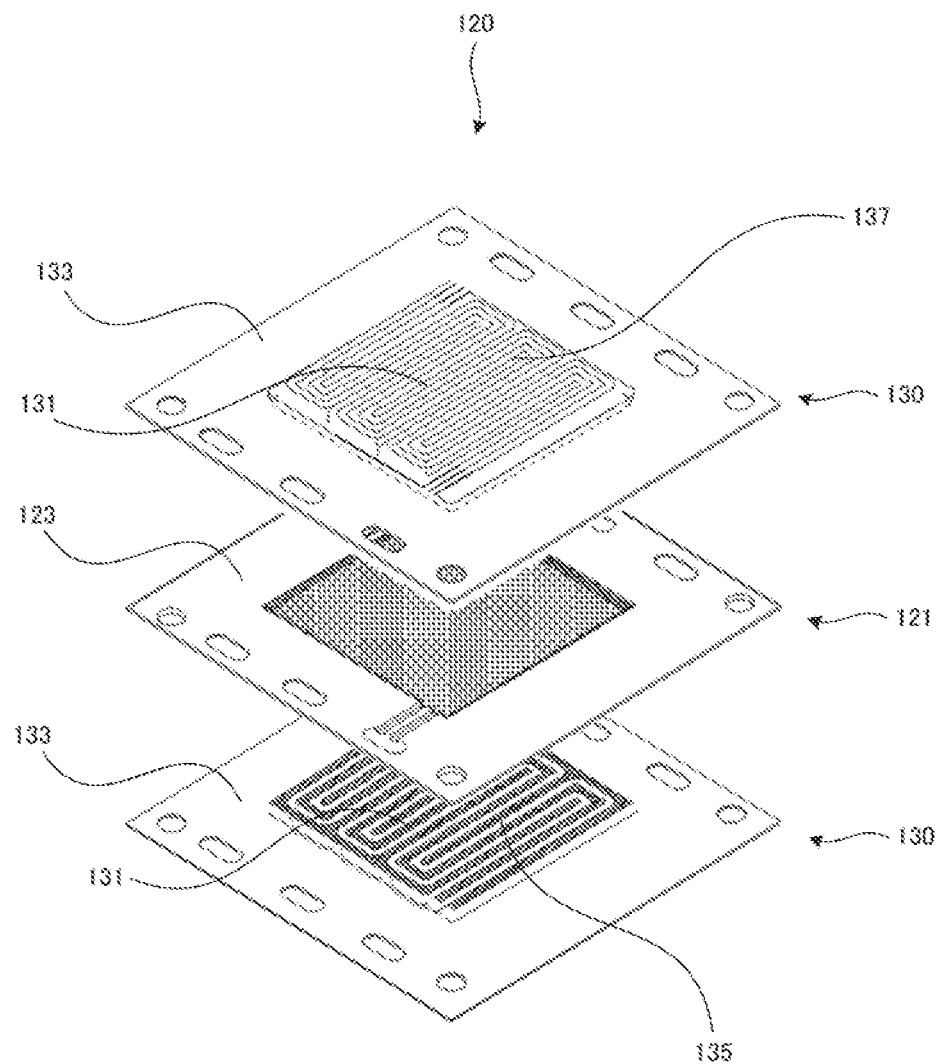
FIG. 5 is an exploded perspective view of an unit fuel cell included in a fuel cell stack according to Embodiment 1.

FIG. 5 is an exploded perspective view of unit fuel cell 120 included in fuel cell stack 100 according to Embodiment 1. As shown in FIG. 5, unit fuel cell 120 is composed of membrane electrode assembly (MEA) 121 and a pair of metal separators 130 sandwiching MEA 121. As shown in FIG. 5, MEA 121 includes frame 123 for covering the outer edges of a polymer electrolyte membrane and catalyst electrodes, and for supporting the polymer electrolyte membrane and the catalyst electrodes.

Metal separator 130 includes at its center corrugated plate section 131 that is molded into a wave shape, and at its outer edge flat plate section 133 that encloses corrugated plate section 131. Further, metal separator 130 includes reaction gas channel 135 on the front surface (surface in contact with MEA 121), and includes coolant channel 137 for allowing a coolant to flow on the rear surface.

FIG. 6A is a cross-sectional view of fuel cell stack 100 of FIG. 4 taken along dashed dotted line α. FIG. 6B is an enlarged view of a region enclosed by square X drawn by a broken line in fuel cell stack 100 of FIG. 6A. As shown in FIG. 6B, in fuel cell stack 100, adjacent metal separators 130 constitutes a pair of separators 140. A pair of separators 140 of the present embodiment will be described below with reference to FIG. 6B

A pair of separators 140 include first metal separator 130*a*, second metal separator 130*b*, sealing members A, B and C.

First metal separator 130*a* and second metal separator 130*b* are arranged on top of each other so that their respective rear surfaces (surfaces on which a coolant channel is formed) face each other. By arranging first metal separator 130*a* and second metal separator 130*b* on top of each other, coolant channel 137 is formed between the pair of separators. Further, flat plate section 133*a* of first metal separator 130*a* is in contact with flat plate section 133*b* of second metal separator 130*b*.

Further, part of flat plate section 133*b* of second metal separator 130*b* protrudes outwardly beyond the edge of flat plate section 133*a* of first metal separator 130*a*. By arranging flat plate section 133*b* of second metal separator 130*b* so that part of flat plate section 133*b* protrudes outwardly beyond the edge of flat plate section 133*a* of first metal separator 130*a*, protruding region 141 is formed.

Sealing member A is arranged on flat plate section 133*a* on the front surface of first metal separator 130*a* to seal in the first reaction gas. Sealing member B is arranged on flat plate section 133*b* on the front surface of second metal separator 130*b* to seal in the second reaction gas.

Sealing member C is arranged on protruding region 141 on the rear surface of second metal separator 130*b* to seal in a coolant flowing through coolant channel 137. According to the present embodiment, to prevent protruding region 141 from being deformed by a pressure applied to sealing member C, protrusion 125 is formed on frame 123 at a position corresponding to the rear surface of sealing member C.

Figure 6C:
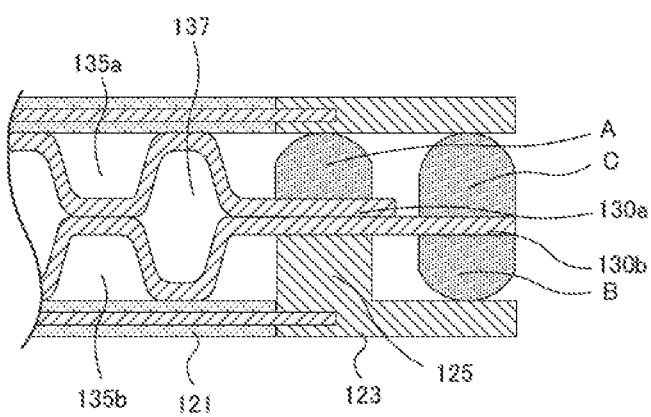

In FIGS. 6A and 6B, sealing member B is positioned opposite to sealing member A with respect to the first and second metal separators, but sealing member B may be positioned opposite to sealing member C with respect to the second metal separator as shown in FIG. 6C. In that case, to prevent flat plate sections 133*a* and 133*b* from being deformed by a pressure applied to sealing member A, protrusion 125 is formed on frame 123 at a position corresponding to the rear surface of sealing member A.

Figure 7:
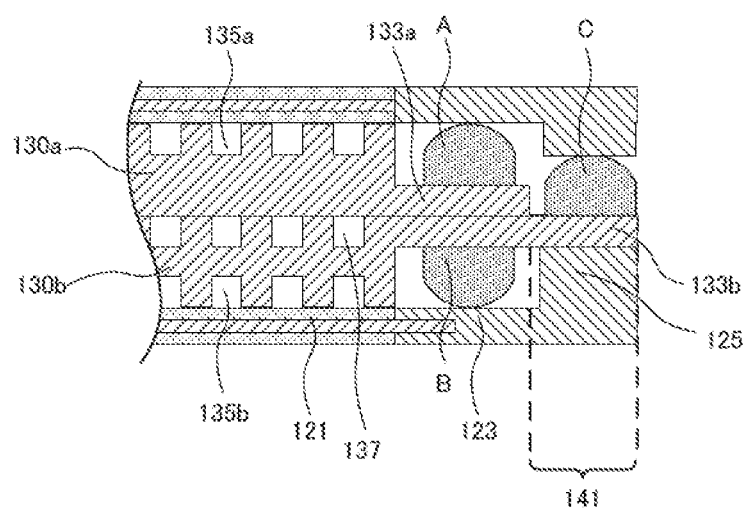
FIG. 7 is a cross-sectional view of a fuel cell stack according to Embodiment 1 having a separator made by machining.

Further, FIGS. 6A, 6B and 6C have described an embodiment where a separator is made of metal (wave-shaped separator), but the separator may be separator 130 manufactured by machine processing a conductive plate made of, for example, carbon, as shown in FIG. 7.

Next, functions of sealing members (A, B, and C) will be described below with reference to FIG. 8A. FIG. 8A is an enlarged view of a pair of separators 140 shown in FIG. 6B. As shown in FIG. 8A, first reaction gas 136*a* flowing through reaction gas channel 135*a* of first metal separator 130*a* is sealed in by sealing member A. Further, second reaction gas 136*b* flowing through reaction gas channel 135*b* of second metal separator 130*b* is sealed in by sealing member B.

Coolant 139 flowing through coolant channel 137 may leak through a gap between first metal separator 130*a* and second metal separator 130*b* to outside. This is because it is technically difficult to make flat plate section 133 of metal separator 130 complete flat, and thus it is inevitable that a fine gap appears between flat plate section 133*a* and flat plate section 133*b*.

However, according to the present embodiment, sealing member C is arranged on protruding region 141 on the rear surface of the second metal separator to seal in coolant 139 by sealing member C, preventing coolant 139 from leaking outside a fuel cell stack.

Further, a coolant that has leaked to space H between sealing member A and sealing member C remains in space H. However, space H is a closed space, and thus there is no influence of the leaked coolant on performance of the fuel cell.

As described above, according to the pair of fuel cell separators of Embodiment 1, the flat plate sections of the first metal separator and the second metal separator are in contact with each other, so that the separators will not be deformed even when a fastening pressure is applied to the fuel cell stack. Further, by making part of the second metal separator the protruding region and arranging sealing member C for sealing in a coolant on the rear surface of the protruding region, coolant leakage can be prevented.

Figure 8B:
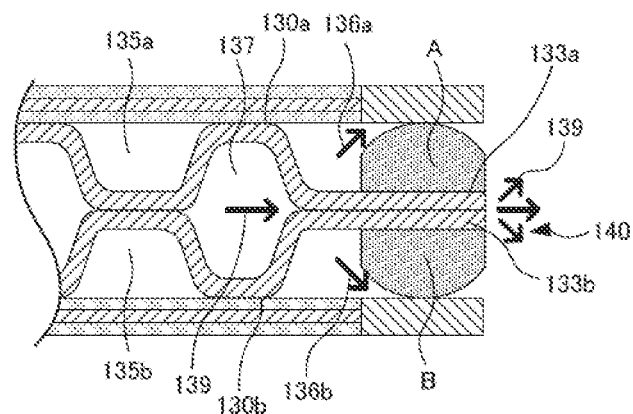

On the other hand, as shown in FIG. 8B, when a pair of separators 140 do not include sealing member C, coolant 139 leaks outside fuel cell stack 100 after leaking from a gap between first metal separator 130*a* and second metal separator 130*b*.

Figure 8C:
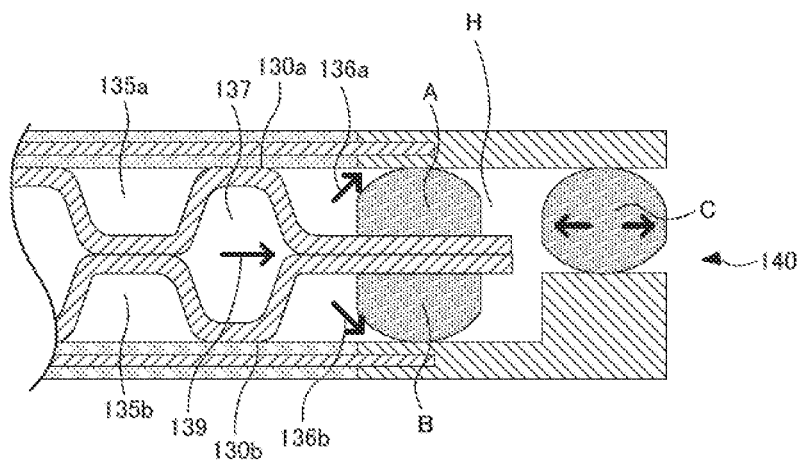

Further, it may be possible to achieve an effect of preventing coolant leakage even when sealing member C is not arranged on a separator as shown in FIG. 8C. However, when sealing member C is not arranged on the separator, the position of sealing member C is deviated or sealing member C is deformed by a fastening pressure. For this reason, sealing member C is preferably arranged on the protruding region of the second metal separator.

Embodiment 2

Embodiment 2 will describe an embodiment where a pair of separators further include sealing member D.

Figure 9:
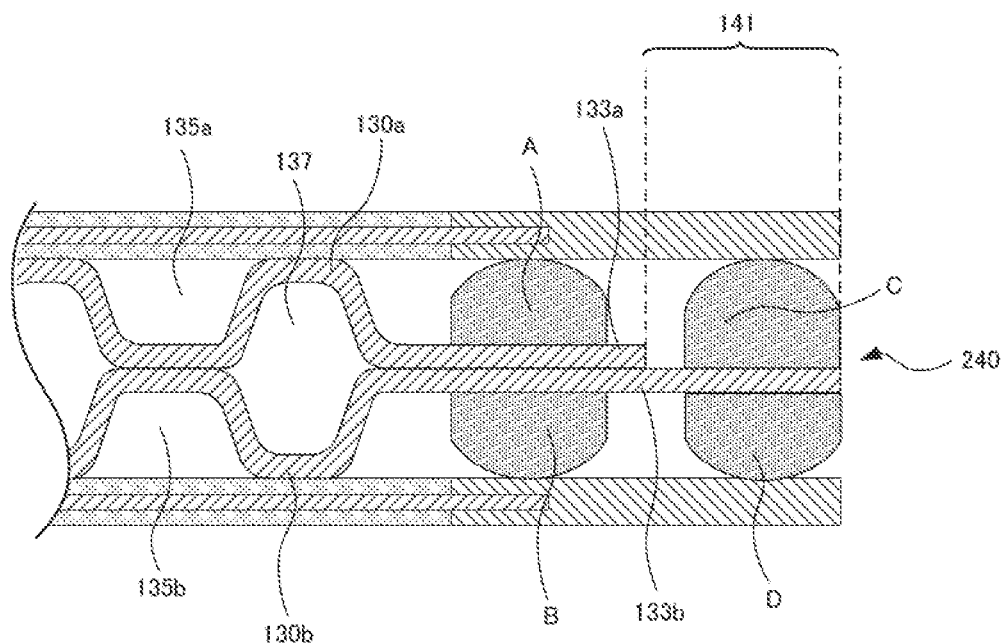
FIG. 9 is a cross-sectional view of a pair of separators for a fuel cell according to Embodiment 2.

FIG. 9 is a cross-sectional view of a pair of separators 240 according to Embodiment 2. Components identical to those of a pair of separators 140 of Embodiment 1 are given the same reference signs and descriptions are not provided. As shown in FIG. 9, a pair of separators 240 of Embodiment 2 include sealing member D arranged on flat plate section 133*b* of the front surface of second metal separator 130*b*. Further, sealing member D is arranged at a position outside sealing member B (outer edge side of a fuel cell stack). In FIG. 9, sealing member D is arranged in protruding region 141 on the front surface of second metal separator 130*b*.

According to the present embodiment, sealing member A is positioned opposite to sealing member B with respect to the first and second metal separators, and sealing member C is positioned opposite to sealing member D with respect to the second metal separator.

As described above, according to the present embodiment, by further providing sealing member D, the second reaction gas can be double-sealed in by sealing members B and D. By this means, the channel's reliability for sealing in the second reaction gas can be further enhanced. Out of fuel gas and oxidizing gas, hydrogen contained in fuel gas has a smaller molecular weight than oxygen contained in oxidizing gas, so that hydrogen is more likely to leak. Further, because hydrogen gas is highly reactive, controlling the leakage of hydrogen gas is more important. Therefore, according to the present embodiment, fuel gas is preferably the second reaction gas to be double-sealed in. As described above, the present embodiment provides an effect of further improving the channel's reliability for sealing in a gas by double-sealing in reaction gas for which leakage requires to be more strictly controlled, in addition to the effects of Embodiment 1.

Embodiment 3

Embodiments 1 and 2 have described an embodiment where respective sealing members are separated. Embodiment 3 will describe an embodiment where respective sealing members are integrally molded.

FIG. 10 is a cross-sectional view of a pair of separators 340 according to Embodiment 3. A pair of separators 340 of Embodiment 3 are the same as a pair of separators 240 of Embodiment 2, except that respective sealing members are integrally molded. Components identical to those of a pair of separators 240 of Embodiment 1 are given the same reference signs and descriptions are not provided.

As shown in FIG. 10, a pair of separators 340 of Embodiment 3 include protector 145 covering the edge of second metal separator 130b. Generally, the front surface and rear surface of a metal separator are surface-treated and thus are hard to deteriorate. On the other hand, the edge of a metal separator is not necessarily surface-treated, and thus may deteriorate due to generation of rust, or the like. By providing protector 145 for covering the edge of the second metal separator as with the present embodiment, the edge of second metal separator 130b can be prevented from deteriorating.

Further, according to the present embodiment, sealing members A, B, C, and D and protector 145 are integrally molded using the same material. By integrally molding sealing members and a protector in this way, first metal separator 130a and second metal separator 130b can be secured with flat plate sections of the first and second metal separators being arranged on top of each other. Accordingly, the relative position of first metal separator 130a and second metal separator 130b can be fixed, improving assembly accuracy of a fuel cell stack. Further, by securing first metal separator 130a and second metal separator 130b, a pair of separators 340 can be treated as a single component, improving handling characteristics of a pair of separators 340.

Further, even in the case where respective sealing members are integrally molded as with the present embodiment, it is preferable that the respective sealing members be in line contact with the MEA. For this reason, it is preferable that region E of the integrated sealing member which connects sealing members A and C and region F of the integrated sealing member which connects sealing members B and D be not in contact with MEA 121.

Figure 11:
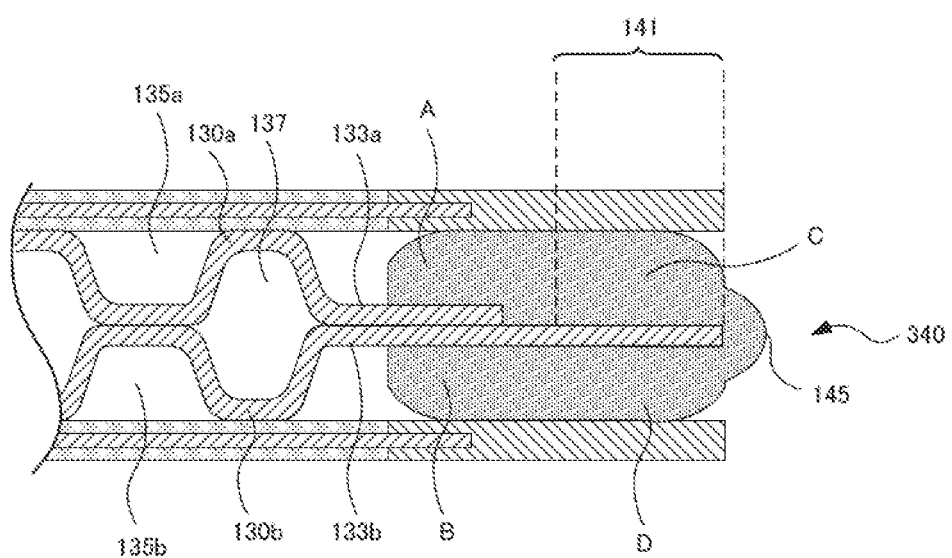
FIG. 11 is a cross-sectional view of a pair of separators for a fuel cell in which a sealing member is in surface contact with the pair of separators.

On the other hand, in the case where an integrally molded sealing member is in surface contact with the MEA as shown in FIG. 11, a fastening pressure to be applied to the sealing member is dispersed, impairing the channel's property for sealing in a fluid.

Next, a structure in the vicinity of manifold holes of a pair of separators 340 of the present embodiment will be described below with reference to FIG. 12 and FIGS. 13A to 13B.

Figure 12:
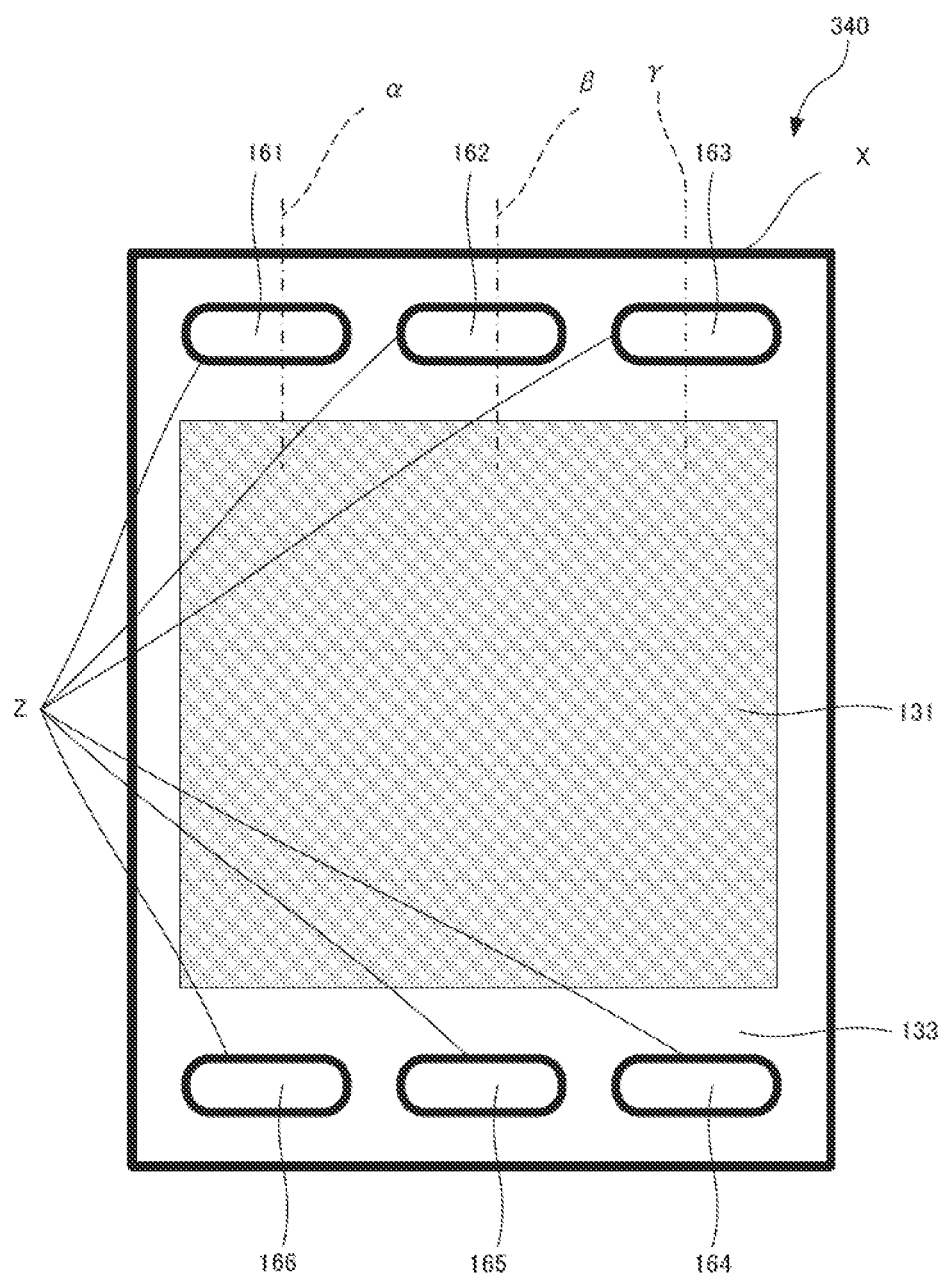
FIG. 12 is a plan view of a pair of separators for a fuel cell according to Embodiment 3.

FIG. 12 is a plan view of a pair of separators 340 according to Embodiment 3, viewed from the first metal separator side. As shown in FIG. 12, a pair of separators 340 include first reaction gas supply manifold hole 161, coolant supply manifold hole 162, second reaction gas supply manifold hole 163, first reaction gas discharge manifold hole 164, coolant discharge manifold hole 165, and second reaction gas discharge manifold hole 166. Bold line X enclosing the outer edge of a pair of separators 340 indicates integrated sealing members A, B, C, and D. Further, a pair of separators 340 include sealing member Z arranged on the outer edge of each manifold hole.

Figure 13A:
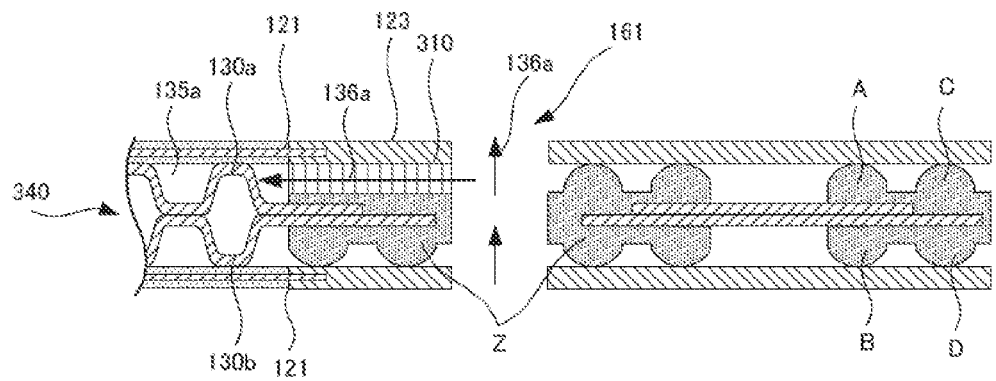
FIGS. 13A to 13C are cross-sectional views of a pair of separators for a fuel cell according to Embodiment 3.

FIG. 13A is a cross-sectional view of a pair of separators 340 of FIG. 12 taken along dashed dotted line α. For the purpose of convenience, FIG. 13A shows a pair of separators 340 sandwiched between two MEAs 121. As shown in FIG. 13A, cross sections of a pair of separators 340 in the vicinity of first reaction gas supply manifold hole 161 include first reaction gas communication section 310 that allows gas to communicate between first reaction gas supply manifold hole 161 and first reaction gas channel 135a.

As shown in FIG. 13A, first reaction gas 136a flowing through first reaction gas supply manifold hole 161 flows through first reaction gas communication section 310 into first reaction gas channel 135a. First reaction gas communication section 310 include a support member for preventing communication section 310 from being pressed to become narrower via sealing member Z. The support member may be a protrusion formed on frame 123, a protrusion formed on first metal separator 130a, or a spacer arranged between frame 123 and first metal separator 130a.

Figure 13B:
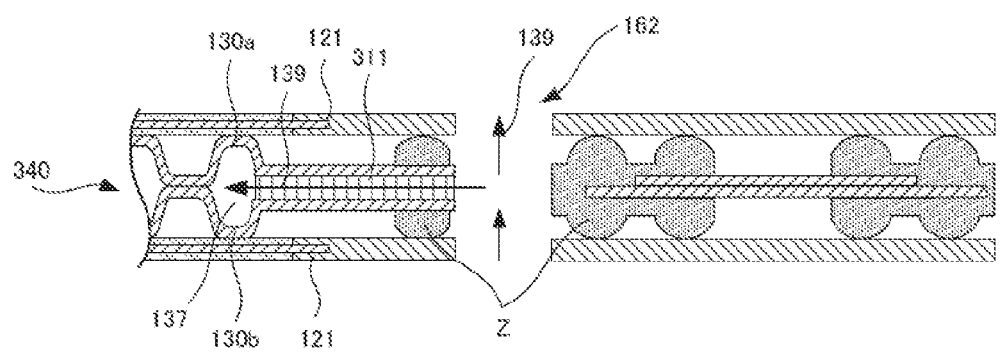

FIG. 13B is a cross-sectional view of a pair of separators 340 of FIG. 12 taken along dashed dotted line β. For the purpose of convenience, FIG. 13B shows a pair of separators 340 sandwiched between two MEAs 121. As shown in FIG. 13B, cross sections of a pair of separators 340 in the vicinity of coolant supply manifold hole 162 include coolant communication section 311 that allows a coolant to communicate between coolant supply manifold hole 162 and coolant channel 137.

As shown in FIG. 13B, coolant 139 flowing through coolant supply manifold hole 162 flows through coolant communication section 311 into coolant channel 137. As with first reaction gas communication section 310, coolant communication section 311 includes a support member for preventing coolant communication section 311 from being pressed to become narrower via sealing member Z. In that case, the support member may be a protrusion formed on first metal separator 130a or second metal separator 130b, or a spacer arranged between first metal separator 130a and second metal separator 130b.

Figure 13C:
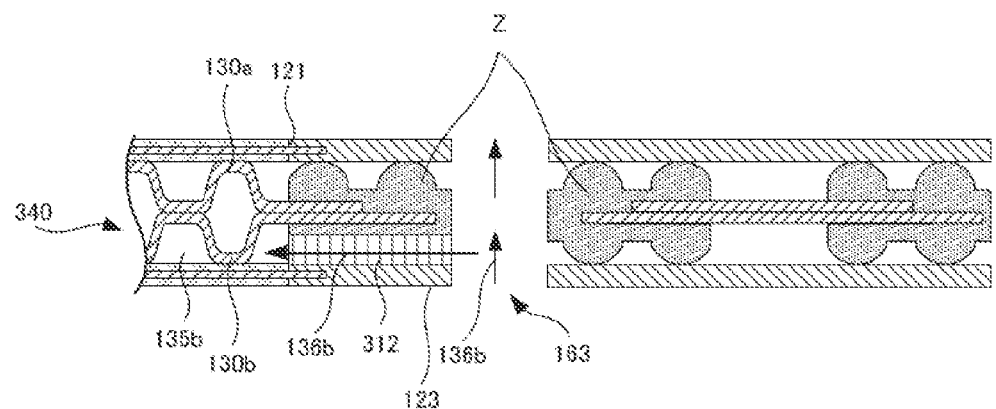

FIG. 13C is a cross-sectional view of a pair of separators 340 of FIG. 12 taken along dashed dotted line γ. For the purpose of convenience, FIG. 13C shows a pair of separators 340 sandwiched between two MEAs 121. As shown in FIG. 13C, cross sections of a pair of separators 340 in the vicinity of second reaction gas supply manifold hole 163 include second reaction gas communication section 312 that allows gas to flow from second reaction gas supply manifold hole 163 to second reaction gas channel 135b.

As shown in FIG. 13C, second reaction gas 136b flowing through second reaction gas supply manifold hole 163 flows through second reaction gas communication section 312 into second reaction gas channel 135b. As with first reaction gas communication section 310, second reaction gas communication section 312 includes a support member for preventing second reaction gas communication section 312 from being pressed to become narrower via sealing member Z.

Next, a method of manufacturing a pair of separators 340 of the present embodiment using insert injection molding will be described below. The method of manufacturing a pair of separators 340 of the present embodiment includes:

1) a first step of arranging first metal separator 130a and second metal separator 130b on top of each other, 2) a second step of inserting the above arranged first metal separator 130a and second metal separator 130b into a mold with a cavity of the shape of the sealing members and protector 145, 3) a third step of injecting a material of the sealing members and protector 145 into the cavity. Each step will be described below with reference to FIGS. 14A to 14C.

Figure 14A:
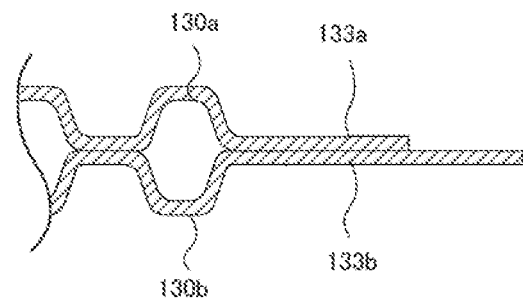
FIGS. 14A to 14C show a manufacturing process of a pair of separators for a fuel cell according to Embodiment 3.

FIG. 14A shows the first step. As shown in FIG. 14A, in the first step, first metal separator 130a and second metal separator 130b are provided and then arranged on top of each other so that rear surfaces of first metal separator 130a and second metal separator 130b face each other.

Figure 14B:
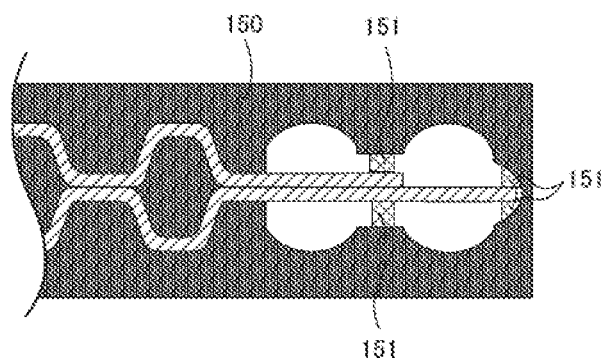

FIG. 14B shows the second step. As shown in FIG. 14B, in the second step, the above arranged first metal separator 130a and second metal separator 130b are put in mold 150 with a cavity of the shape of the sealing members and protector 145.

Further, as shown in FIG. 14B, in the second step, it is preferable that flat plate sections 133 of first metal separator 130a and second metal separator 130b be secured in the cavity by securing member 151. By securing flat plate sections 133 of the above arranged first metal separator 130a and second metal separator 130b in this way, it is possible to prevent the relative position of first metal separator 130a and second metal separator 130b from being deviated or to prevent the metal separators from being deformed, when a material (resin) of sealing members is injected into the cavity.

Figure 14C:
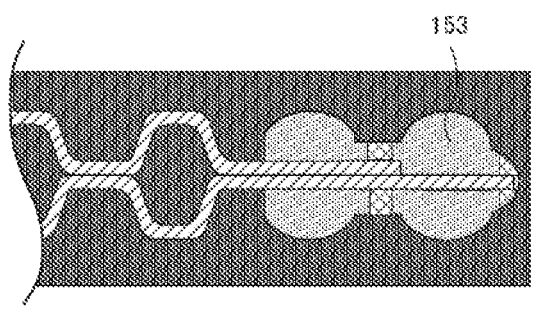

FIG. 14C shows the third step. As shown in FIG. 14C, in the third step, material 153 of the sealing members and protector 145 is injected in the cavity to integrally mold sealing members A, B, C and D and protector 145.

Figure 15:
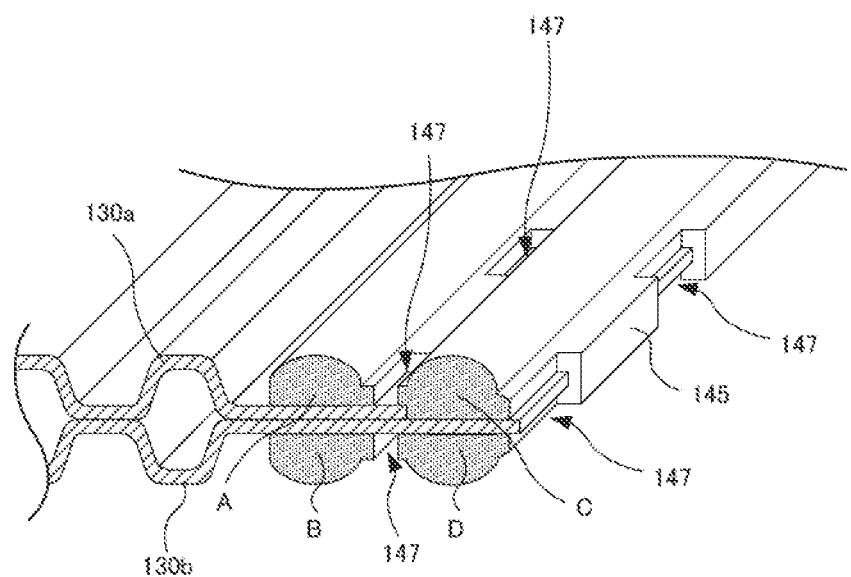
FIG. 15 is a perspective view of a pair of separators for a fuel cell according to Embodiment 3.

FIG. 15 is a perspective view of a pair of separators 340 thus manufactured. As shown in FIG. 15, an integrally molded sealing member includes openings 147 at places where securing members have been arranged. Part of the flat plate section on the front surface of first metal separator 130a or second metal separator 130b is exposed through opening 147.

As described above, according to the present embodiment, the relative position of the first metal separator and the second metal separator can be fixed, so that the present embodiment provides an effect of improving accuracy of assembly of a fuel cell stack, in addition to the effects of Embodiment 2. Further, by securing the first metal separator and the second metal separator, it is possible to treat a pair of separators as a single component, thus improving handling characteristics of the pair of separators. Further, integrally molding sealing sections and a protector makes it possible to form the protector and all sealing members in one step.

Embodiment 4

Embodiment 4 will describe an embodiment where a metal separator has a hole.

Figure 16:
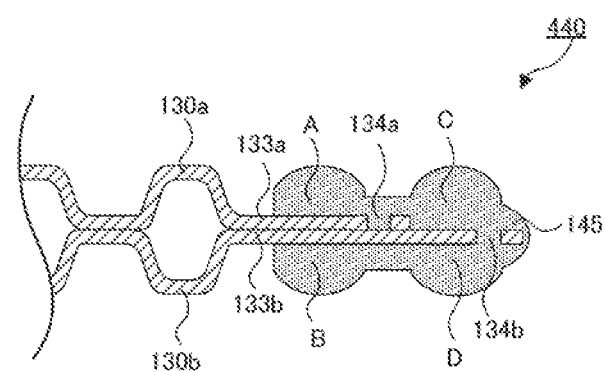
FIG. 16 is a cross-sectional view of a pair of separators for a fuel cell according to Embodiment 4.

FIG. 16 is a cross-sectional view of a pair of separators 440 according to Embodiment 4. A pair of separators 440 of Embodiment 4 are the same as a pair of separators 340 of Embodiment 3, except that a metal separator has a hole. Components identical to those of a pair of separators 340 of Embodiment 3 are given the same reference signs and descriptions are not provided.

As shown in FIG. 16, flat plate section 133a of first metal separator 130a includes hole 134a filled with an integrally molded sealing member. Further, flat plate section 133b of second metal separator 130b includes hole 134b filled with the integrally molded sealing member.

As described above, by providing holes filled with an integrally molded sealing member on the flat plate sections of the metal separators, the integrally molded sealing member is secured to the metal separators more reliably.

Embodiment 5

Embodiment 5 will describe an embodiment where a metal separator has a protrusion.

Figure 17:
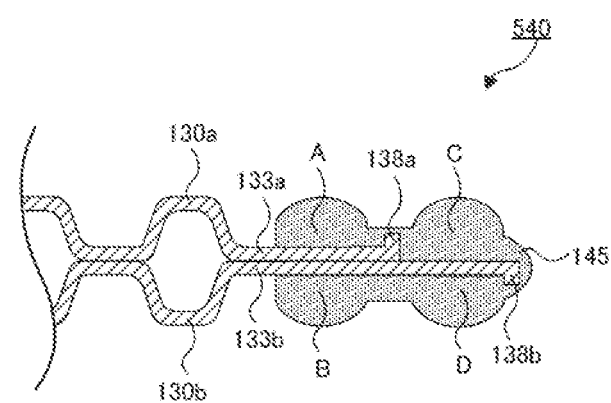
FIG. 17 is a cross-sectional view of a pair of separators for a fuel cell according to Embodiment 5.

FIG. 17 is a cross-sectional view of a pair of separators 540 according to Embodiment 5. A pair of separators 540 of Embodiment 5 are the same as a pair of separators 340 of Embodiment 3, except that a metal separator has a protrusion. Components identical to those of a pair of separators 340 of Embodiment 3 are given the same reference signs and descriptions are not provided.

As shown in FIG. 17, flat plate section 133a of first metal separator 130a has protrusion 138a embedded in an integrally molded sealing member. Further, flat plate section 133b of second metal separator 130b has protrusion 138b embedded in the integrally molded sealing member.

As described above, by providing protrusions embedded in an integrally molded sealing member on the flat plate sections of metal separators, the integrally molded sealing member is secured to the metal separators more reliably.

This application is entitled and claims the benefit of Japanese Patent Application No. 2009-174508, filed on Jul. 27, 2009, the disclosure of which including the specification, drawings and abstract is incorporated herein by reference in its entirety.

INDUSTRIAL APPLICABILITY

A pair of separators integrated with a sealing member according to the present invention has high sealing reliability, therefore can regulate gases or a coolant flowing through separator channels to reliably prevent gases and a coolant from being mixed. The fuel cell stack according to the present invention is used for portable power sources, power sources for electric vehicles, and household cogeneration systems, for example.

REFERENCE SIGNS LIST 100 fuel cell stack
101 first reaction gas supply port
102 coolant supply port
103 second reaction gas supply port
104 first reaction gas discharge port
105 coolant discharge port
106 second reaction gas discharge port
107 end plate
109 fastening bolt
111 nut
120 unit fuel cell
121 MEA
123 frame
125 protrusion
130 metal separator
131 corrugated plate section
133 flat plate section
134 hole formed in metal separator
135 reaction gas channel
136 reaction gas
137 coolant channel
138 protrusion formed on metal separator
139 coolant
140, 240, 340, 440, 540 a pair of separators for fuel cell
141 protruding region 145 protector
147 opening
150 mold
151 securing member
153 material of sealing member and protector
161 first reaction gas supply manifold hole
162 coolant supply manifold hole
163 second reaction gas supply manifold hole
164 first reaction gas discharge manifold hole
165 coolant discharge manifold hole
166 second reaction gas discharge manifold hole
310 first reaction gas communication section
311 coolant communication section
312 second reaction gas communication section

The invention claimed is:

1. A fuel cell stack comprising:
a membrane electrode assembly having a polymer electrolyte membrane, a pair of catalyst electrodes, and a frame covering outer edges of the polymer electrolyte membrane and the pair of catalyst electrodes, the pair of catalyst electrodes including a fuel electrode and an air electrode sandwiching the polymer electrolyte membrane; and
a pair of separators for a fuel cell that sandwiches the membrane electrode assembly by arranging the pair of separators at both sides of the membrane electrode assembly, wherein
the pair of separators for a fuel cell comprising:
a first separator and a second separator, each of the first separator and the second separator having a front surface and a rear surface and having at a center of the separator a corrugated plate section molded into a wave shape and at an outer edge of the separator a flat plate section enclosing the corrugated plate section,
the corrugated plate section on the front surface constituting a reaction gas channel,
the corrugated plate section on the rear surface constituting a coolant channel,
the first separator and the second separator being arranged on top of each other so that the rear surfaces of the first separator and the second separator face each other and that the flat plate section of the first separator and the flat plate section of the second separator are in contact with each other,
the flat plate section of the second separator protruding outwardly beyond the edge of the flat plate section of the first separator;
sealing member A that is arranged on the flat plate section on the front surface of the first separator;
sealing member B that is arranged on the flat plate section on the front surface of the second separator; and
sealing member C that is arranged on a region on the flat plate section on the rear surface of the second separator, the region protruding outwardly beyond the flat plate section of the first separator,
wherein the sealing member B is positioned opposite to the sealing member A with respect to the first separator and the second separator, and the frame has a protrusion at a position corresponding to a rear surface of the sealing member C to prevent a protruding region of the flat plate section of the second separator protruding outwardly beyond an edge of the flat plate section of the first separator from being deformed.

2. The fuel cell stack according to claim 1, wherein the first separator is an air electrode separator, and the second separator is a fuel electrode separator.

3. A fuel cell stack comprising:
a membrane electrode assembly having a polymer electrolyte membrane, a pair of catalyst electrodes, and a frame covering outer edges of the polymer electrolyte membrane and the pair of catalyst electrodes, the pair of catalyst electrodes including a fuel electrode and an air electrode sandwiching the polymer electrolyte membrane; and
a pair of separators for a fuel cell that sandwiches the membrane electrode assembly by arranging the pair of separators at both sides of the membrane electrode assembly, wherein
the pair of separators for a fuel cell comprising:
a first separator and a second separator, each of the first separator and the second separator having a front surface and a rear surface and having at a center of the separator a corrugated plate section molded into a wave shape and at an outer edge of the separator a flat plate section enclosing the corrugated plate section,
the corrugated plate section on the front surface constituting a reaction gas channel,
the corrugated plate section on the rear surface constituting a coolant channel,
the first separator and the second separator being arranged on top of each other so that the rear surfaces of the first separator and the second separator face each other and that the flat plate section of the first separator and the flat plate section of the second separator are in contact with each other,
the flat plate section of the second separator protruding outwardly beyond the edge of the flat plate section of the first separator;
sealing member A that is arranged on the flat plate section on the front surface of the first separator;
sealing member B that is arranged on the flat plate section on the front surface of the second separator; and
sealing member C that is arranged on a region on the flat plate section on the rear surface of the second separator, the region protruding outwardly beyond the flat plate section of the first separator,
wherein the sealing member B is positioned opposite to the sealing member C with respect to the second separator, and the frame has a protrusion at a position corresponding to a rear surface of the sealing member A to prevent a protruding region of the flat plate section of the second separator protruding outwardly beyond an edge of the flat plate section of the first separator from being deformed.

4. The fuel cell stack according to claim 3, wherein the first separator is an air electrode separator, and the second separator is a fuel electrode separator.

* * * * *